US008290756B2

(12) United States Patent
Fevrier et al.

(10) Patent No.: US 8,290,756 B2
(45) Date of Patent: Oct. 16, 2012

(54) METHOD FOR SIMULATING THE THERMOMECHANICAL BEHAVIOR OF A TIRE ROLLING ON THE GROUND

(75) Inventors: Pierre Fevrier, Clermont-Ferrand (FR); Hervé Martin, Zurich (CH); Gérard Fandard, Eglisenevve D'Entraigues (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 444 days.

(21) Appl. No.: 12/439,684

(22) PCT Filed: Jul. 26, 2007

(86) PCT No.: PCT/FR2007/001296
§ 371 (c)(1),
(2), (4) Date: Aug. 14, 2009

(87) PCT Pub. No.: WO2008/025892
PCT Pub. Date: Mar. 6, 2008

(65) Prior Publication Data
US 2010/0010795 A1 Jan. 14, 2010

(30) Foreign Application Priority Data
Sep. 1, 2006 (FR) .................................. 06 07706

(51) Int. Cl.
G06F 17/50 (2006.01)
(52) U.S. Cl. .................................. 703/2; 703/6; 73/146
(58) Field of Classification Search .................. 703/6, 8, 703/2; 73/146
See application file for complete search history.

(56) References Cited

U.S. PATENT DOCUMENTS
7,320,246 B2 * 1/2008 Schick et al. ................... 73/146

2005/0150283 A1 * 7/2005 Shick et al. ................... 73/146
(Continued)

FOREIGN PATENT DOCUMENTS
EP 1516751 A 3/2005

OTHER PUBLICATIONS

S. Futamura et al., "Simplifying the Thermal Analysis of a Rolling Tire with Deformation Index Method", 2004 Technical Meeting of the American Chemical Society, Rubber Division, pp. 1-27, May 17, 2004.

(Continued)

Primary Examiner — Thai Phan
(74) Attorney, Agent, or Firm — Cozen O'Connor

(57) ABSTRACT

A process for simulating the physical behavior of a vehicle tire rolling on the ground with which the tire tread has an area of contact including at least one adherent contact zone and at least one sliding contact zone, which process includes at least modeling operations, wherein the modeling operations, by applying physical laws that are known and/or developed by specific experimentation, as a first model, a model of the longitudinal forces (Fx), the transverse forces (Fy), and a self-alignment torque (Mz), including an adherence coefficient and a shear modulus of the rubber of the tire, and on the basis of dynamic parameters associated with the physical conditions of rolling and use of the tire, in which the self-alignment torque is associated with the intensity of the longitudinal and transverse forces and their distribution in the contact area, a second model of a local heating model expressing variations in a temperature of contact of the tread with the ground, and a third model of a general heating and thermal flux model, in which said third model in a peripheral tread temperature and an internal tire temperature, a coefficient of thermal conductivity of the tread, and phenomena with a thermodynamic component such as internal deformations of the tire, heat transfers between the tire and its environment, and slip of the tread on the ground, in which at least the adherence coefficient and the shear modulus are involved in the first models as variable.

9 Claims, 12 Drawing Sheets

U.S. PATENT DOCUMENTS

2009/0292515 A1* 11/2009 Fevrier et al. .................. 703/6
2010/0318335 A1* 12/2010 Martin et al. .................. 703/8

OTHER PUBLICATIONS

Teodorescu et al., "Influence Factors on Truck Tyre Rolling Resistance", Polytechnical University of Bucharest, Scientific Bulletin, Series D: Mechanical Engineering, vol. 62, No. 2, pp. 65-73, 2000.

C-R Lee et al., "Validation of a FEA Tire Model for Vehicle Dynamic Analysis and Full Vehicle Real Time Proving Ground Simulation", SAE Paper No. 971100, 1997, pp. 1-8.

A.R. Plummer, "Model-in-the-loop testing", Proceedings of the Institution of Mechanical Engineers, Part I, vol. 220, pp. 183-199, May 2006.

* cited by examiner

Figure 1
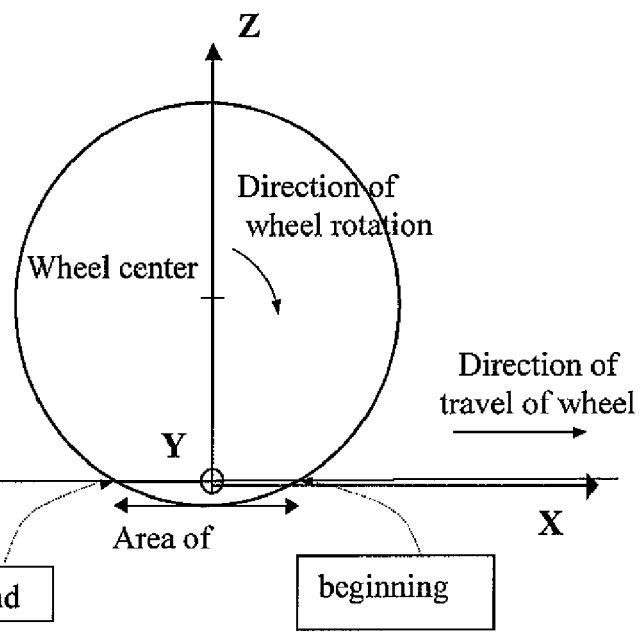
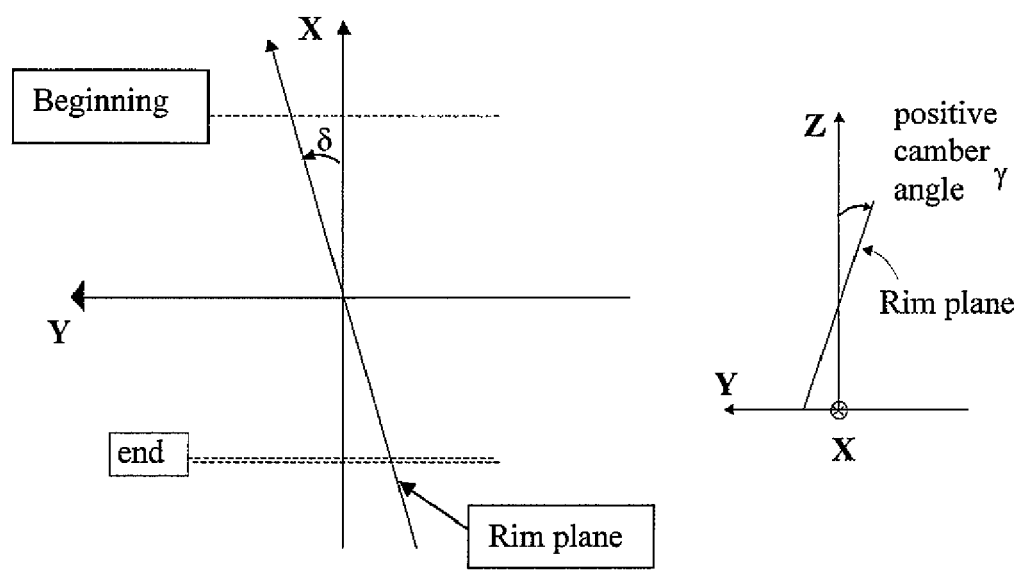
Figure 2
Figure 3

METHOD FOR SIMULATING THE THERMOMECHANICAL BEHAVIOR OF A TIRE ROLLING ON THE GROUND

RELATED APPLICATIONS

This is a U.S. National Phase Application under 35 USC §371 of International Application PCT/FR2007/001296, filed on Jul. 26, 2007.

This application claims the priority of French patent application no. 06/07706 filed Sep. 1, 2006, the subject matter of which is hereby incorporated by reference.

FIELD OF THE INVENTION

The invention relates in general to techniques associated with the tire equipment of motor vehicles.

More specifically, the invention relates to a process for simulating the physical behavior of a vehicle tire rolling on the ground with which the tire tread has an area of contact including at least one adherent contact zone and at least one sliding contact zone, which process includes at least modeling operations, numeric value assignment operations, and solving operations, in which the modeling operations involve at least establishing, by applying physical laws that are known and/or developed by specific experimentation, and as a first model, a model of the longitudinal forces, the transverse forces, and a self-alignment torque, transmitted by the tire between the ground and the vehicle, on the basis of specific physical parameters, including an adherence coefficient and a shear modulus of the rubber mixture of the tire tread, and on the basis of dynamic parameters associated with the physical conditions of rolling and use of the tire, in which the self-alignment torque is associated with the intensity of the longitudinal and transverse forces and their distribution in the contact area, in which the assignment operations involve at least assigning numeric values to the dynamic parameters and to the specific parameters, and in which the solving operations involve at least deducing, using at least the first model and the values assigned to the dynamic parameters and to the specific physical parameters, the values of the longitudinal forces, the transverse forces and the self-alignment torque.

BACKGROUND OF THE INVENTION

A number of tire simulation processes are known to a person skilled in the art, and examples are provided in patent documents EP 1 371 534, EP 1 516 751 and US 2001/0020386.

The most widely known process, developed by M. Pacejka in 1996 and disseminated under the name "Magic Formula", models the tire by means of parameters lacking a causal link with the physics, and is thus unsuitable for reliably taking into consideration the forces transmitted by a tire, especially in situations involving high and/or variable forces.

While some of the most recent simulation processes, and in particular those described in the aforementioned patent documents, use a more or less complete physical model of the tire, these processes do not enable entirely realistic values for the longitudinal forces, the transverse forces and the self-alignment torque of the tire to be provided.

SUMMARY OF THE INVENTION

An object of the invention is to overcome the limitations of the existing processes, such as those described above.

To this end, one aspect of the invention is directed to a method wherein the modeling operations also include the establishment, as a second model, of a local heating model expressing variations in a temperature of contact of the tread with the ground from the beginning to the end of the contact area due to the contact and the slip of the tread with the ground, and the establishment, as a third model, of a general heating and thermal flux model, in which said third model expresses variations, over a period of at least one wheel rotation, in a peripheral temperature of the tread and an internal tire temperature on the basis of values previously known or estimated from peripheral and internal temperatures, a coefficient of thermal conductivity of the tread, and phenomena with a thermodynamic component such as internal deformations of the tire, heat transfers between the tire and its environment, and slip of the tread on the ground, in which at least the adherence coefficient and the shear modulus are involved in the first model as variables, respectively based on the peripheral temperature and the internal temperature, in which the value of the peripheral temperature, obtained by solving operations concerning the third model, is used by solving operations concerning the second model in order to take into account the temperature dependence of the adherence coefficient, and in which the value of the internal temperature, obtained by solving operations concerning the third model, is used by solving operations concerning the first model in order to take into account the temperature dependence of the shear modulus of the rubber mixture of the tire tread.

It is advantageous for the first model to include equations associated with conditions of equilibrium of the basic shear and slip forces of the tread in the contact area, for the process of the invention to include at least one iterative calculation phase consisting of a series of calculation cycles, and for each calculation cycle to include at least one solving operation concerning the first model and one solving operation concerning the second model.

The process of the invention, in one possible embodiment, can be implemented by ensuring that the contact area is discretized at least in a first of its dimensions, that each cycle of each iterative phase includes a series of operations for analyzing the conditions of equilibrium of the basic shear and slip forces on respective basic surfaces different from the contact area, distributed along the first dimension of the contact area, and that each cycle of the iterative phase is interrupted when the set of basic surfaces considered in said cycle covers the contact area.

In a preferred embodiment, the process of the invention can be implemented by ensuring that the first model is established by considering that the contact area includes a single adherent contact zone and a single sliding contact zone separated from one another by a crossing point, that the first model takes the form of a system of equations expressed at least according to dynamic parameters, specific parameters and the abscissa of the crossing point, that each iterative phase is dedicated to phenomena appearing during a corresponding basic time interval, and that each iterative phase is implemented in order to solve, by successive approximations and at least on the basis of values previously known or estimated from the abscissa of the crossing point, the transverse forces, and the self-alignment torque, new values of the abscissa of the crossing point, the transverse forces and the self-alignment torque that solve the system of equations of the first model for the values assigned to the dynamic parameters and to the specific parameters, from which it results that the longitudinal forces, the transverse forces and the self-alignment torque of the tire can be calculated in real time as the vehicle is moving.

In this case, each new calculation cycle of each iterative phase preferably includes operations involving at least:

- calculating a new temporary value of the abscissa of the crossing point on the basis of balance equations of the basic forces and the values previously known or estimated from the transverse forces and the self-alignment torque;
- calculating, on the basis of the new temporary value of the abscissa of the crossing point and equations associating transverse forces and the self-alignment toque with dynamic parameters, specific parameters and the abscissa of the crossing point, new values for the transverse forces and the self-alignment torque that can be used for a possible future calculation cycle;
- conditionally interrupting said iterative phase at least when the difference between the new temporary value of the abscissa of the crossing point and the value previously known or estimated from this abscissa is below a predetermined accuracy limit; and
- interrupting said iterative phase, assigning to the transverse forces and the self-alignment torque, as values for said phase, the new values of the transverse forces and the self-alignment torque obtained in the most recent calculation cycle.

In addition, the process in accordance with an embodiment of the invention advantageously includes an implementation operation after the end of each iterative phase and consisting of updating at least the dynamic parameters in order to take into account changes in said parameters during the time of execution of the iterative phase, and of entering a new iterative phase.

Moreover, the solving operations concerning the third model are preferably performed outside of each iterative phase.

Each iterative phase can be preceded by a preparatory phase during which contingent quantities are calculated, including the dimensions of the contact area, on the basis of the values assigned to the dynamic parameters and to the specific parameters, in which each contingent quantity is used in said iterative phase with a value that was assigned to it in the preparatory phase.

Another aspect of the invention involves applying the process as defined above to the simulation of the dynamic behavior of a vehicle equipped with a chassis and a plurality of tires rolling on the ground, in which application each of the models is used for each tire and associated with a same dynamic chassis model, in which the chassis model provides said models, for each tire, with the values of at least some of the dynamic parameters, and in which the chassis model uses, for each tire, the values of the longitudinal forces, the transverse forces and the self-alignment torque obtained by implementing said models.

In a preferred embodiment, the process of the invention can thus be applied to the real-time simulation of the dynamic behavior of a vehicle.

BRIEF DESCRIPTION OF THE DRAWINGS

Other features and advantages of the invention will become clear from the following description, provided for indicative and non-limiting purposes, which refers to the appended drawings, in which:

FIG. 1 is a diagrammatic elevation view of a wheel equipped with a tire to which the process of the invention is applied;

FIG. 2 is a diagrammatic enlarged top view of the contact area of the tire of FIG. 1 with the ground, in which the tire is in a drift situation with respect to the velocity vector (X-axis);

FIG. 3 is a diagrammatic frontal view of the tire of FIG. 1, in which the tire is in a camber situation;

DETAILED DESCRIPTION OF THE DRAWINGS

Figure 4:
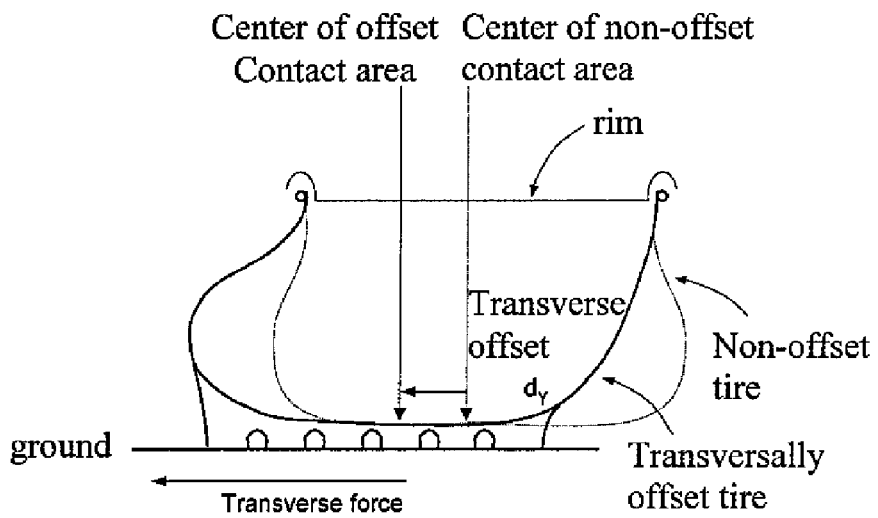
FIG. 4 is a diagrammatic partial and radial cross-section view of a tire shown in two different situations of applied force.

As mentioned above, an aspect of the invention relates in particular to a process for simulating the physical behavior of a vehicle tire rolling on the ground.

When a tire is rolling on the ground, the tire tread has an area of contact with the ground formed by at least one adherent contact zone and at least one sliding contact zone.

The purpose of this process is to provide, on the basis of a certain number of important quantities, the values of various forces that are transmitted by the tire between the ground and the vehicle.

For better understanding of the invention, this description will use the following writing conventions, some of which are already known to a person skilled in the art and used in existing tire models.

| | |
|---|---|
| $\delta$ | Drift angle |
| $\delta^1$ | Drift angle at the breakers |
| $\alpha_1$ | Leveling angle (plysteer) |
| $\gamma$ | Tilt angle (camber) |
| $\tau$ | Longitudinal slip rate |
| Fx | Longitudinal force |
| Fy | Transverse force |
| Fz | Load |
| V | Speed of ground points |
| $W_x$ | Speed of crown according to its axis |
| Mz | Self-alignment torque |
| Ny | Component of the self-alignment torque associated with the force Fy |
| Nx | Component of the self-alignment torque associated with the distribution of forces Fx in the width of the contact area |
| $R_L$ | Lateral rigidity of the tire |
| $R_{LL}$ | Longitudinal rigidity of the tire |
| $k_T$ | Torsional rigidity of the tire |
| $S_Z$ | Bending flexibility on edge of crown block |

-continued

| | |
|---|---|
| μ | Dynamic adherence coefficient between the rubber of the tire and the ground: μ(p, Vg, Ts) |
| $\mu_0$ | Static adherence coefficient |
| Lx | Characteristic length of the contact area |
| Ly | Width of the contact area |
| ent | Grooving rate of the tread |
| AssX | Longitudinal relaxation coefficient of the tread |
| AssY | Lateral relaxation coefficient of the tread |
| G* | Shear modulus of the rubber mixture of the tire tread |
| $e_{KM}$ | Thickness of the tread |
| a | Half-length of the contact area |
| b | Abscissa of initial slip in the contact area |
| Ti | Internal temperature profile of the rubber, between the tire surface and the breakers |
| Ts | Average surface temperature of the tread |
| Tc | Contact temperature at the interface between the rubber and the ground |
| Vg | Slip velocity between the tire and the ground |
| $X_N$ | Coordinates of the points of the tire breaker (internal |
| $Y_N$ | zone of the tread, at the base of the tire, at the vertical of the contact area) |
| $X_k, Y_k$ | Coordinates of the tread points at the interface with the ground |

FIGS. 1 to 3 specify the reference point used.

This reference point is defined by:

O: the point of origin of the reference point at the center of the contact area;

OX: the axis parallel to the velocity vector;

OY: the axis perpendicular to OX, parallel to the ground plane regardless of the camber.

In this reference point, the sign convention requires that: for τ>0, a longitudinal force be generated in the direction of the OX axis; for δ>0, a lateral force is generated in the direction of the OY axis, and for γ>0, a so-called negative self-alignment torque Mz is generated, causing a negative lateral thrust (i.e. in the direction opposite OY).

The forces transmitted by the tire between the ground and the vehicle include longitudinal forces Fx, transverse forces Fy, and a self-alignment torque Mz, which is associated with the intensity of the longitudinal and transverse forces and their distribution in the contact area.

The important quantities typically include dynamic parameters, i.e. variable at least as a function of time, and associated with the physical conditions of rolling and use of the tire, and physical parameters that are specific to the tire considered.

The dynamic parameters include the drift angle, the slip rate, the camber angle, the load, the velocity, the inflation pressure, the air and ground temperatures, the initial tire temperatures and the time.

The specific parameters include the dimensions of the contact area (length, width, shape coefficient), the pressure profile p(x) along the contact area, the longitudinal Kx and transverse Ky rigidities of the tread, the rigidities of the tire structure, namely the lateral rigidity RL, the longitudinal rigidity RLL, the radial rigidity Rrr, and the torsional rigidity $k_T$, the rigidity 1/S2 of the crown block, a law of adherence μ of the rubber/ground torque, lengthwise transfer parameters between reliefs of the tire ("ribs"), and are associated with the dynamic parameters by relationships established by specific experimentation, which can be taken into account by the expressions provided below as examples.

The lateral rigidity corresponds to an offset dy of the contact area (cf. FIG. 4) with respect to the wheel plane under the effect of a lateral force:

$$R_L = R_{LO} + R_{Lp} p$$

where $R_{LO}$ [N/m] represents the structural portion and $R_{Lp}$ [N/m/bars] represents the tire part, and p is the pressure expressed in bars.

Figure 5:
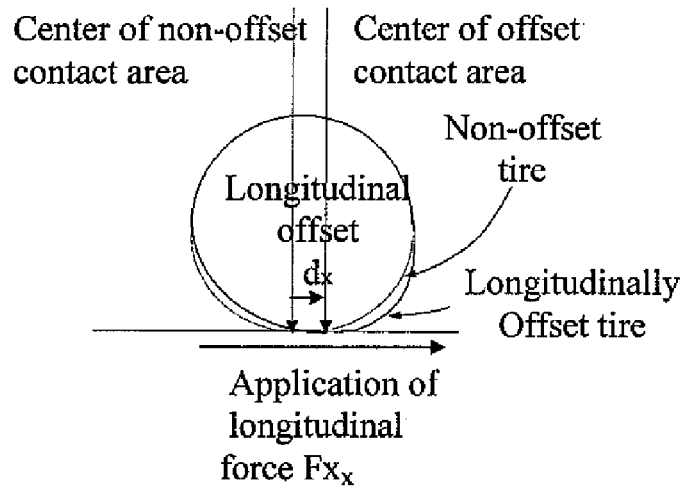
FIG. 5 is a diagrammatic elevation view of a tire shown in two different situations of applied force.

The longitudinal rigidity corresponds to an offset dx of the contact area (cf. FIG. 5) according to the longitudinal axis of the wheel in the presence of a longitudinal force Fx:

$$R_{LL} = R_{LLO} + R_{LLp} p$$

where $R_{LLO}$ [N/m] represents the structural portion and $R_{LLp}$ [N/m/bar] represents the tire part, and p is the pressure expressed in bars.

Figure 6:
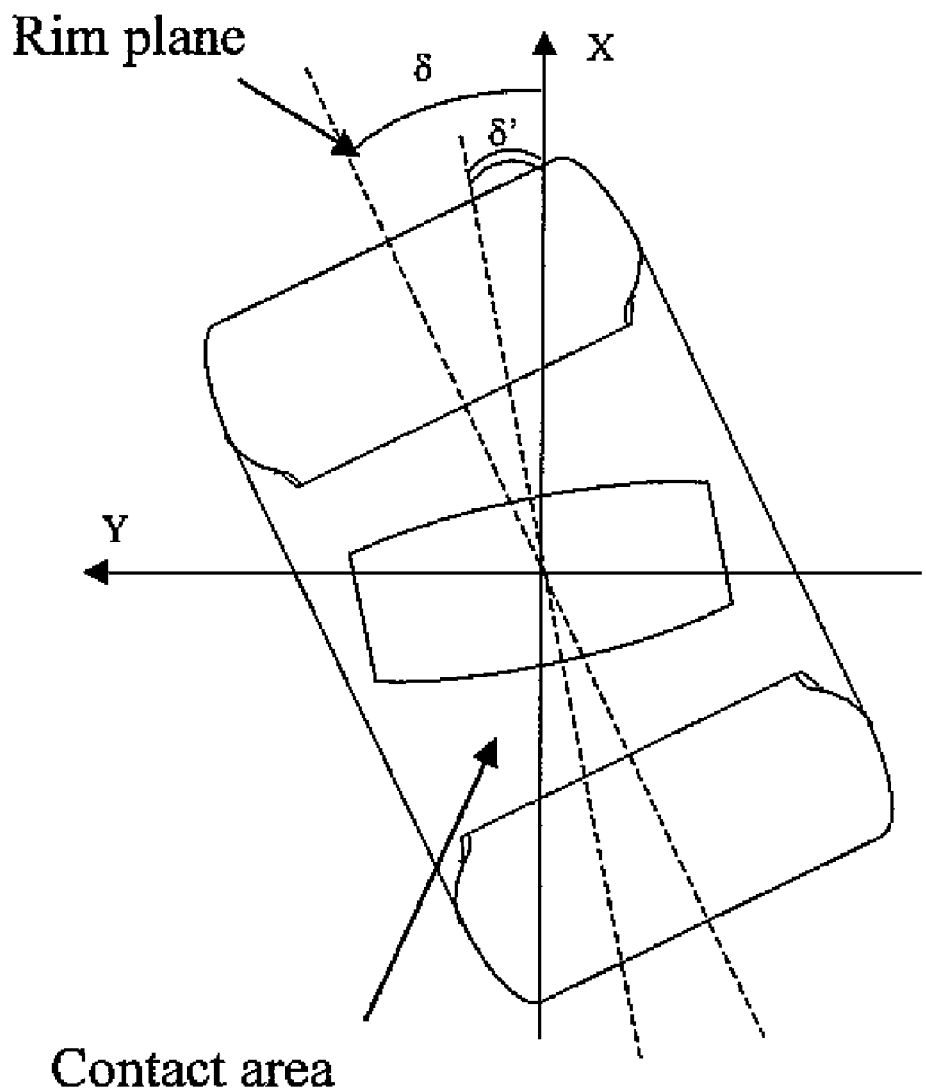
FIG. 6 is a diagrammatic top view of a tire subjected to torsion.

The development of the self-alignment torque Mz leads to torsion with an angle Δδ of the cover around the Z-axis with respect to the rim plane (cf. FIG. 6):

$$\Delta \delta = \frac{M_z}{k_T}$$

The torsional rigidity of the cover contains a structural component $k_{T0}$ [N·m/rad] and a component $k_{TZ}$ [m/rad] that translates the variation in the torsional rigidity with the load, for example, with the form:

$$k_T = (k_{T0} k_{TZ} F_Z) \sqrt{p}$$

The real drift angle $\delta^1$ of the contact area is expressed as a function of the drift angle at the axis of the wheel as follows:

$$\delta^1 = \delta + \frac{M_z}{k_T}$$

The deformation of the crown can be modeled by a law of the second degree with a curvature at the center of the contact area that is expressed, for example, as follows:

$$\rho = S_2 F y$$

where $S_2$ is a parameter representing the bending flexibility at the edge.

The radial rigidity associates the load Fz with the deflection of the crown with respect to the rim. It is dependent on the pressure and can be separated into two terms: a structural term $R_{H0}$ [N/m] which corresponds to the radial rigidity of the tire at zero pressure, and a tire term $R_{RP}$ [N/m/bars]:

$$R_R = R_{R0} + R_{Rp} p$$

The length of the contact area is defined by:

$$Lx = a \sqrt{\frac{F_z}{p^c}} + b \frac{F_z}{p^c},$$

and this formula enables the effect of the load and the inflation pressure to be taken into account.

The width of the contact area is defined by:

$$Ly = Ly_c + 2 * Ly_e$$

where $Ly_c$ is the width of the reliefs at the center of the tire and $Ly_e$ is the width of the reliefs at the shoulders, calculated by the formula below:

$$Ly_e = c \arctan \left[ d \left( \frac{F_z}{p^{0.6}} - e \right)^2 \right].$$

The actual surface of the contact area is defined as the product of the width by the length, weighted by the grooving and a shape coefficient:

$$S_{ADC} = C_{forms} ent Lx Ly$$

The shape coefficient $C_{shape}$ takes into account the variation in shape of the contact area as a function of the load.

When the tire structure is deflected, the crown adopts a tilt $\alpha^1$ which is a characteristic quantity of the structure studied.

The pressure profile between the beginning and the end of the contact area is determined as follows:

$$p(x) = \frac{2n+1}{2n} \frac{F_Z}{S_{ADC}} \left(1 - \left(\frac{x}{Lx/2}\right)^{2n}\right),$$

This pressure distribution is such that:

$$\int_{-Lx/2}^{Lx/2} p(x)dx = \frac{F_Z}{S_{ADC}}.$$

With a small load, the profile is more parabolic (n–1). With a large load, the pressure profile is almost uniform.

Preferably, n is a real number varying linearly with the length of the contact area Lx. To prevent n from becoming too low (or even negative) at small loads, n is given a lower limit of 1, as follows:

$$n = \max(l, n_a Lx + n_b).$$

The process of the invention uses at least one mechanical model (first model) coupled to a local thermal model (second model) and to a general thermal model (third model).

Each of these models is established during a preliminary phase of the process and takes the form of a system of equations.

These models can be established in a number of ways, and in particular by using physical laws known to a person skilled in the art, or more or less similar laws established by specific experimentation, so that the equations by which these models are expressed can take multiple forms.

These models are therefore characterized essentially by their input quantities, their output quantities, and the fact that they each take the form of a system of equations accounting for physical phenomena observable on the basis of quantifiable physical properties.

The output quantities of the mechanical model are the longitudinal forces Fx, the lateral forces Fy, and the self-alignment torque Mz.

The output quantity of the local thermal model is the temperature of the tread along the contact area.

And the output quantities of the general thermal model are the average peripheral or surface temperature Ts of the tread, and the profile of the internal temperature Ti of this tread in the direction of its thickness.

Figure 7:
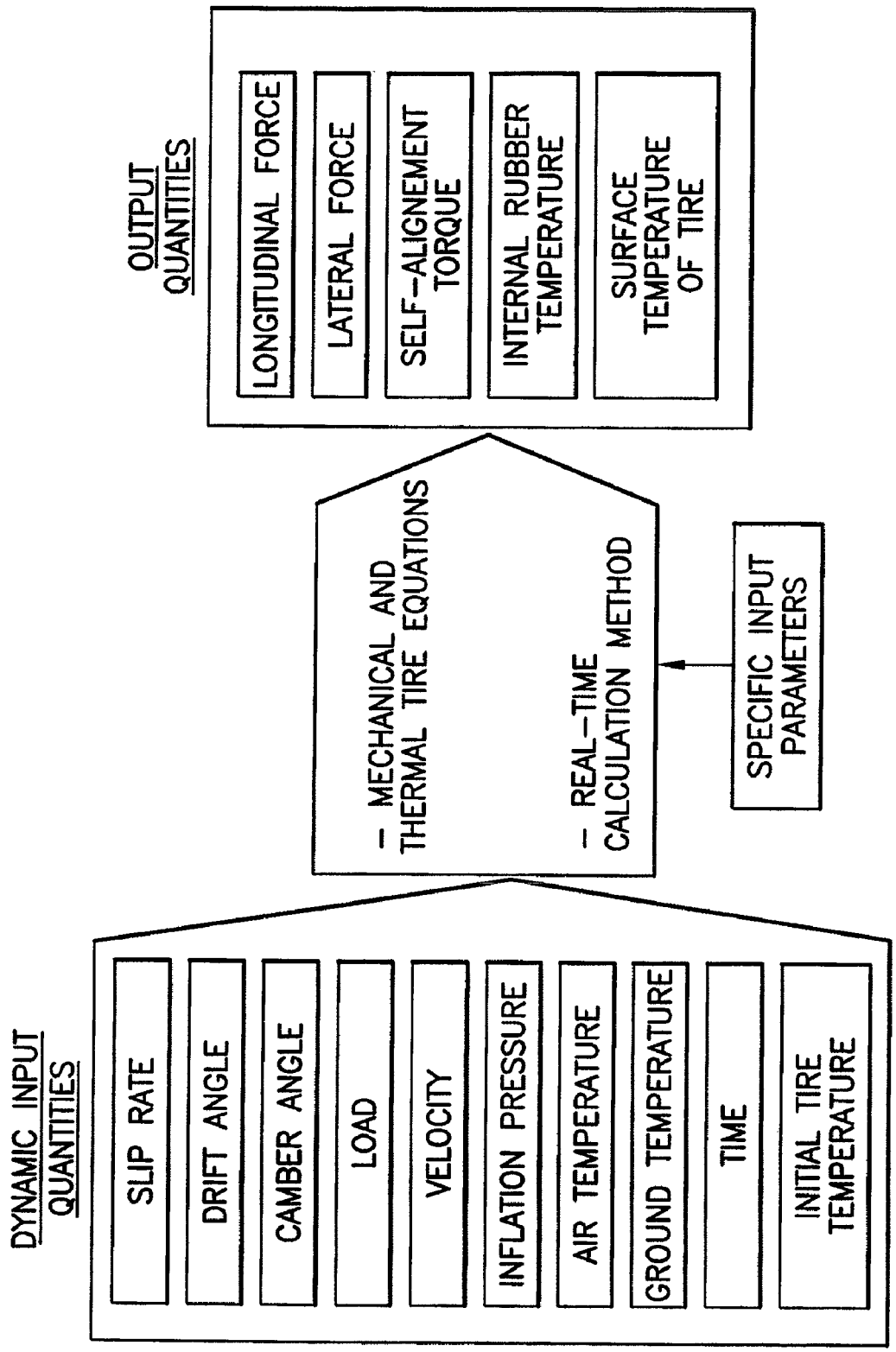
FIG. 7 is a diagram showing the various quantities involved in the implementation of the process of the invention.

The input and output quantities of all of these models are indicated in FIG. 7.

Figure 8:
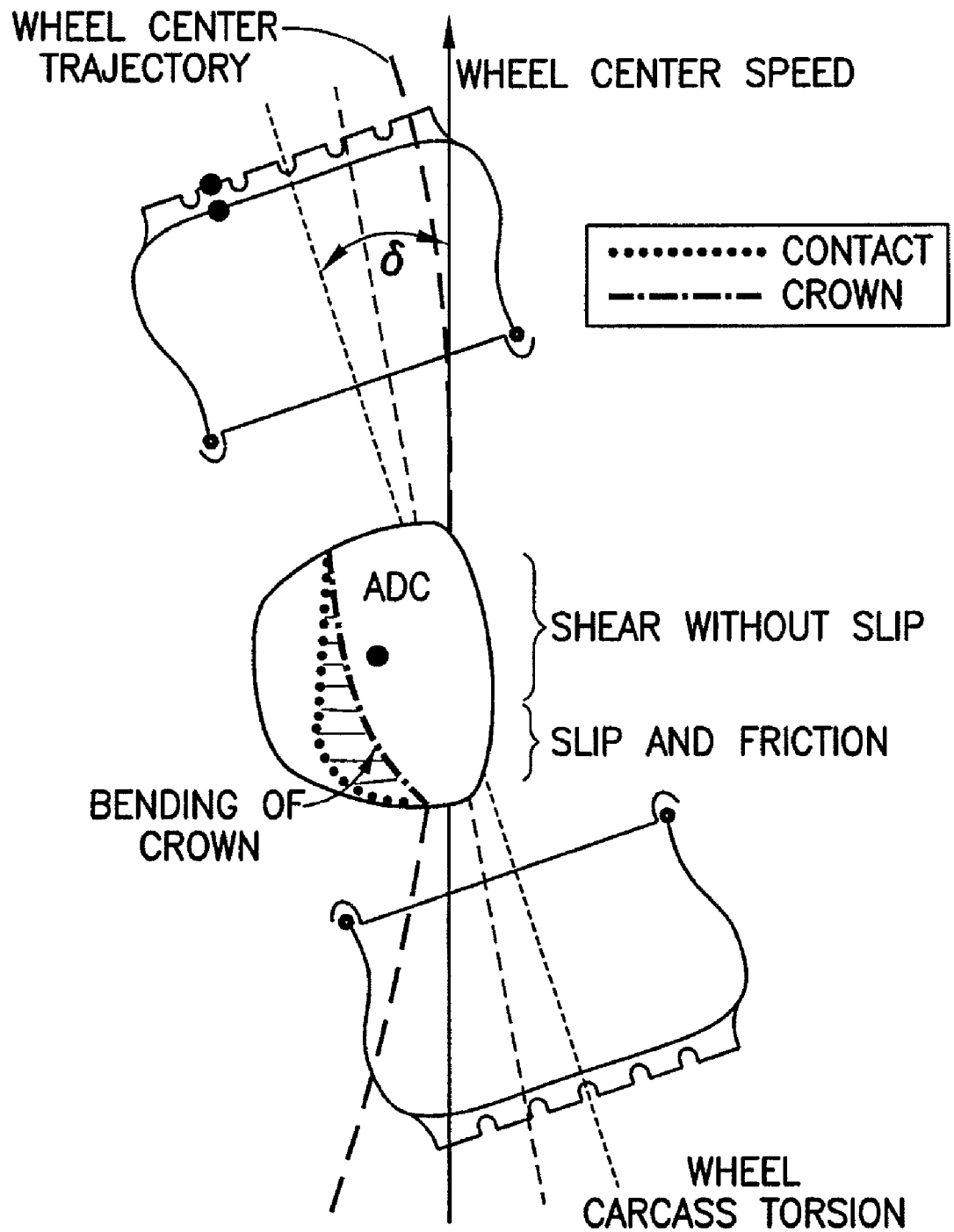
FIG. 8 is a diagrammatic top view of a tire subjected to various applied forces.

In the preferred embodiment of the invention, the mechanical model is also characterized by the fact that it is established by considering that a contact area includes two zones (FIG. 8), namely an adherent contact zone where the force is controlled by the shear of the tread with imposed displacement and a sliding contact zone where the force is controlled by the friction coefficient between the rubber and the ground, and by considering that there is a single point N of abscissa "b" marking the passage between the adherent contact zone and the sliding contact zone.

The equations are formulated according to this principle, thus enabling expressions that can be solved quickly to be obtained.

An example of an advantageous mechanical model is provided below.

In this example, the modeling of the functioning of the contact area is based on a "brush hair" approach with a first shear phase at the beginning of the contact area and a second slip phase. It is assumed that these two phases are distinct, unique and related, and that there is no parasitic mechanism for taking up shear force in the slip phase.

All of the following developments are based on the assumption that the drift angles remain moderate (below around 20 degrees), so that the approximation $\tan(\delta) \approx \delta$ is valid and will be performed systematically.

Kx and Ky designate rigidities of the tread, which can be associated with the modulus of the rubber and the properties of the sculpture preferably according to the following relation:

$$\begin{cases} K_X = \dfrac{G*ent}{\dfrac{h_{scre}}{AssX} + h_{sc}} \\ K_Y = \dfrac{G*ent}{\dfrac{h_{scre}}{AssY} + h_{sc}} \end{cases}$$

in which $h_{scre}$ is the thickness of the sculpture, and $h_{sc}$ is the thickness of the sub-layer, such that $e_{KM} = h_{scre} + h_{sc}$.

Figure 9:
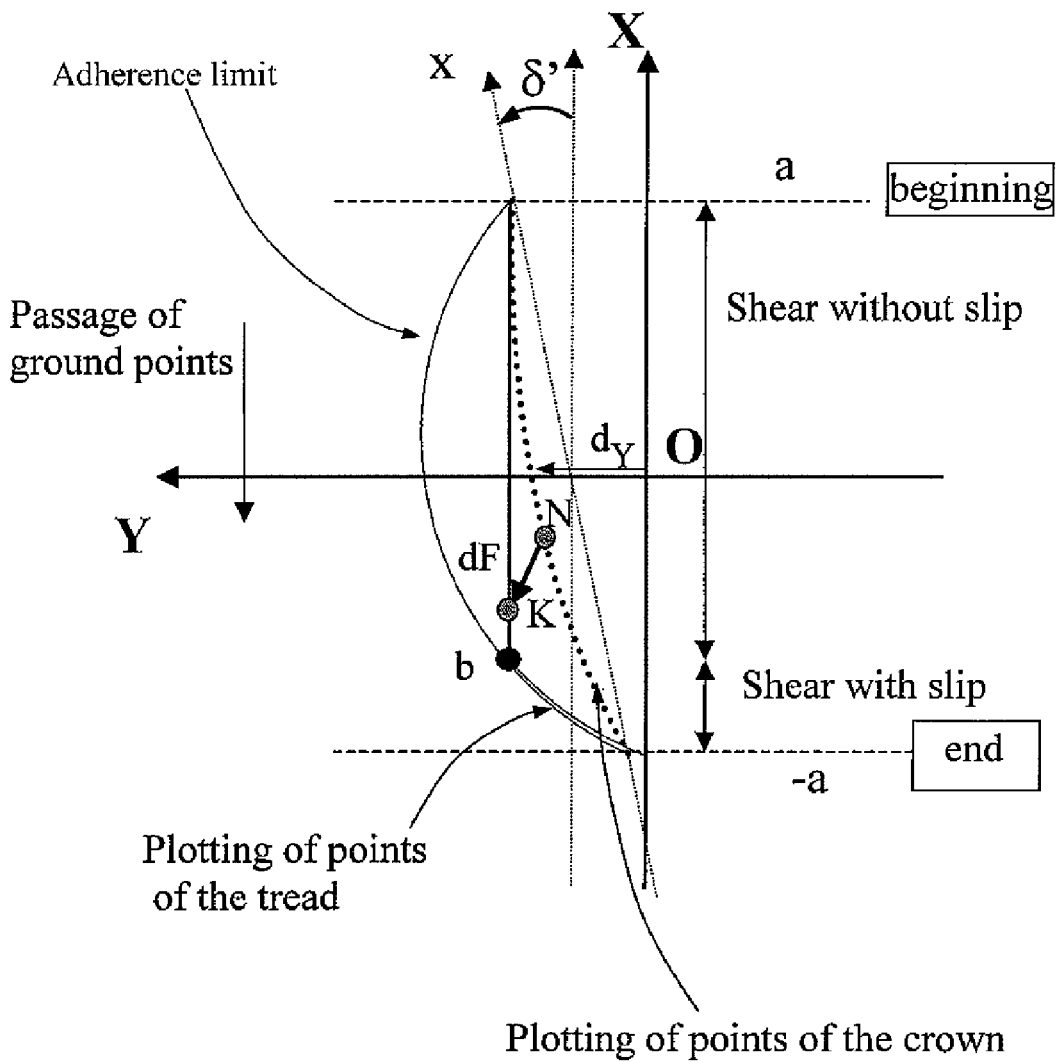
FIG. 9 is an enlarged top view of the contact area of a tire subjected to various applied forces, and showing the plotting of points and characteristic trajectories.

FIG. 9 is a functional diagram of the contact area. The segment NK defines an element of the tread ("brush hair"). N is the point located at the level of the crown and K is the point of the tread at the level of the ground. The abscissa point b represents the transition between the contact with adherence and the sliding contact.

At the beginning of the contact area (see FIG. 9), the rubber element of the tread is not sheared ($X_N = X_K$).

The shear of the rubber in fact has a plurality of origins: a drift of the wheel with an angle $\delta$, a camber with an angle $\gamma$, and a difference between the velocity of point N of the crown and the velocity of the passage of the ground points.

On the assumption of a uniform deformation in the thickness of the tread, the basic force generated by the shear force of an element of this tread can be written:

$$dF_X = K_X(X_K - X_N)dS$$

$$dF_Y = K_Y(Y_K - Y_N)dS$$

where dS is the basic surface of the element NK of the tread.

The equation of the trajectory of the points of the crown is approximated by the following relation:

$$Y_N = \delta' X_N - \frac{1}{2} S_2 F_Y X_N^2 + \frac{F_Y}{R_L},$$

in which expression $\delta^1$ is the drift angle of the crown, which differs from the drift angle due to the torsion of the tire structure, which satisfies the equation:

$$\delta' = \delta + \alpha 1 + \frac{M_Z}{k_T}.$$

Assuming that the relation $Y_K(a) = Y_N(a)$ is satisfied at the beginning of the contact area, then (equation 1):

$$Y_K - Y_N = \delta'(a - X_N) - \frac{1}{2} S_2 F_Y (a^2 - X_N^2)$$

If it is established that:
V is the velocity of the ground points,
$W_x$ is the velocity of the points of the crown according to its axis, and $$\tau = \frac{W_X - V}{V},$$

the expression $X_K - X_N$ becomes (equation 2):

$$X_K - X_N = (a - X_N)\frac{\tau}{1+\tau}$$

By definition, $\tau$ corresponds to the longitudinal slip rate. The components of the slip velocity are given by:

$$\begin{cases} Vg_X = \dfrac{d(X_K - X_N)}{dt} = W_X - V \\ Vg_Y = \dfrac{d(Y_K - Y_N)}{dt} = (\delta' - S_2 F_Y X_N)W_X \end{cases}$$

In the sliding portion of the contact area, the basic forces are generated by the friction between the rubber and the ground and the direction of the forces is collinear with the shear vector, which means:

$$\frac{dF_X}{dF_Y} = r_K \frac{(X_K - X_N)}{(Y_K - Y_N)} \text{ with } r_K = \frac{K_X}{K_Y}.$$

By noting $$\beta = \delta' - \frac{1}{2}S_2 F_Y(a + X_N): \quad \frac{dF_X}{dF_Y} = r_K \frac{\tau}{(1+\tau)\beta}.$$

The basic forces in the friction zone are written:

$$dF_X = -\frac{r_K \tau}{\sqrt{(r_K \tau)^2 + (1+\tau)^2 \beta^2}} \mu(p, Vg, T) p\, dS$$

$$dF_Y = -\frac{(1+\tau)\beta}{\sqrt{(r_K \tau)^2 + (1+\tau)^2 \beta^2}} \mu(p, Vg, T) p\, dS$$

The abscissa b of point N, from which the slip of the tire is assumed to occur on the ground, corresponds to the equilibrium between the basic shear and adherence forces, which equilibrium is represented by equation 3:

$$[K_X(X_K - X_N)]^2 + [K_Y(Y_K - Y_N)]^2 = [\mu_0 p]^2$$

where $\mu_0$ is the static adherence coefficient expressed at the abscissa point b.

While, in principle, in the contact area, there can be a plurality of transition points between an adherence zone and a sliding zone, the mechanical model used in the preferred embodiment of the invention is advantageously based on the assumption that there is only one such transition point. In other words, once a slip appears in the contact area, this slip is assumed to last until the end of this contact area.

The equations representative of all of the forces, based on the assumption that there is only one crossing point, are provided below.

It is nevertheless possible to provide a more general version, corresponding to the case in which a plurality of crossing points might exist in the contact area.

Moreover, the embodiment shown in FIGS. 14a and 14b, which uses a discretization of the tread in the contact area and which will be discussed later, does not make any assumption in principle about the number of crossing points in the contact area.

The forces applied at the center of the wheel equipped with the tire considered are obtained by integrating the basis forces produced at the surface of the contact area:

$$F_X = \int_{-Ly/2}^{Ly/2} \int_b^a K_X(X_K - X_N) dS +$$

$$\int_{-Ly/2}^{Ly/2} \int_{-a}^b \frac{r_K \tau}{\sqrt{(r_K \tau)^2 + (1+\tau)^2 \beta^2}} \mu(p, Vg, T) p\, dS$$

$$F_Y = \int_{-Ly/2}^{Ly/2} \int_b^a K_Y(Y_K - Y_N) dS +$$

$$\int_{-Ly/2}^{Ly/2} \int_{-a}^b \frac{(1+\tau)\beta}{\sqrt{(r_K \tau)^2 + (1+\tau)^2 \beta^2}} \mu(p, Vg, T) p\, dS$$

The integration leads respectively to the following equations 4 and 5:

$$F_X = K_X Ly\left[\frac{1}{2}\frac{\tau}{1+\tau}(a-b)^2\right] +$$

$$Lyent \int_{-a}^b \frac{r_K \tau}{\sqrt{(r_K \tau)^2 + (1+\tau)^2 \beta^2}} \mu(p, Vg, T) p\, dx$$

$$F_Y = K_Y Ly\left[\frac{1}{2}\delta'(a-b)^2 - \frac{S_2 F_Y}{6}(2a^3 - 3a^2 b + b^3)\right] +$$

$$Lyent \int_{-a}^b \frac{(1+\tau)\beta}{\sqrt{(r_K \tau)^2 + (1+\tau)^2 \beta^2}} \mu(p, Vg, T) p\, dx$$

The self-alignment torque $M_z$ has two contributions, namely a torque $N_y$ associated with the force $F_y$ of which the center of pressure is offset with respect to the center of the contact area, and a torque $N_x$ associated with the distribution of forces $F_x$ in the width of the contact area. In general, the torque $N_x$ is a return torque, except in specific cases of a high engine torque.

In the same context of assumptions as above, the torque $N_y$ can be calculated directly by equation 6:

$$N_Y = K_Y Ly\left[\frac{1}{6}\delta'(a^3 - 3ab^2 + 2b^3) - \frac{S_2 F_Y}{8}(a^2 - b^2)^2\right] +$$

$$Lyent \int_{-a}^b \frac{(1+\tau)\beta}{\sqrt{(r_K \tau)^2 + (1+\tau)^2 \beta^2}} \mu(p, Vg, T) px\, dx$$

The torque $N_x$ is created by a non-uniform distribution of forces $F_x$ in the width of the contact area, which tends to be amplified when the contact area becomes trapezoidal under the effect of the deflection or the camber. In a modeling approach with a single tire relief tread, the distribution of forces $F_x$ in the width of the contact area is not directly accessible. Thus, the torque $N_x$ is modeled by an ad hoc relationship of which a mathematical formulation is provided below for indicative purposes on the basis of the torque $N_\gamma$ and the camber (equation 7):

$$Nx=\beta_1(Fz)Ny+\beta_2(Fz,\delta)\gamma$$

An example of local and general thermal models is provided below.

The local thermal model essentially takes into account the thermal phenomena associated with the contact of the tread with the ground in the contact area and the relative slip of the tread in a portion of the contact area.

The general thermal model takes into account all of the heating phenomena and the heat exchanges of the tire over at least one wheel rotation.

The formulation of the general forces of the tire is based on the decomposition into the shear force of the tread and the frictional force. The frictional force is dependent on the adherence coefficient μ between the rubber and the ground, which coefficient is dependent on the pressure, the slip velocity and the contact temperature.

The contact temperature in the contact area is modeled as follows (local thermal model).

When the rubber passes into the contact area, the contact temperature changes as a function of the thermal conduction and the friction between the rubber and the ground. The temperature in the contact can be calculated in various ways known to a person skilled in the art, for example by means of methods of discretization by finite differences.

The process described below optimizes the calculation time while resulting in a largely sufficient precision.

On the assumption of two semi-infinite materials with a homogeneous temperature (Ts for the rubber and Tsol for the ground), the surface temperature, when the two masses are suddenly placed in perfect contact, is written:

$$T_0 = \frac{T_S e_g + T_{sol} e_{sol}}{e_g + e_{sol}},$$

where $e_g$ and $e_{sol}$ are the respective thermal effusivities of the rubber and of the ground.

When there is slip between the rubber and the ground, the frictional flow $\phi_F$ generates an increase in surface temperature, which, when the flow is constant, is expressed by:

$$Tc(t) = T_0 + 2\frac{\alpha}{e_g}\varphi_F\sqrt{\frac{t}{\pi}},$$

where α is the distribution coefficient that determines the proportion of flow that penetrates the rubber. In the case of perfect contact, this coefficient is expressed by:

$$\alpha = \frac{e_g}{e_g + e_{sol}}.$$

Figure 10:
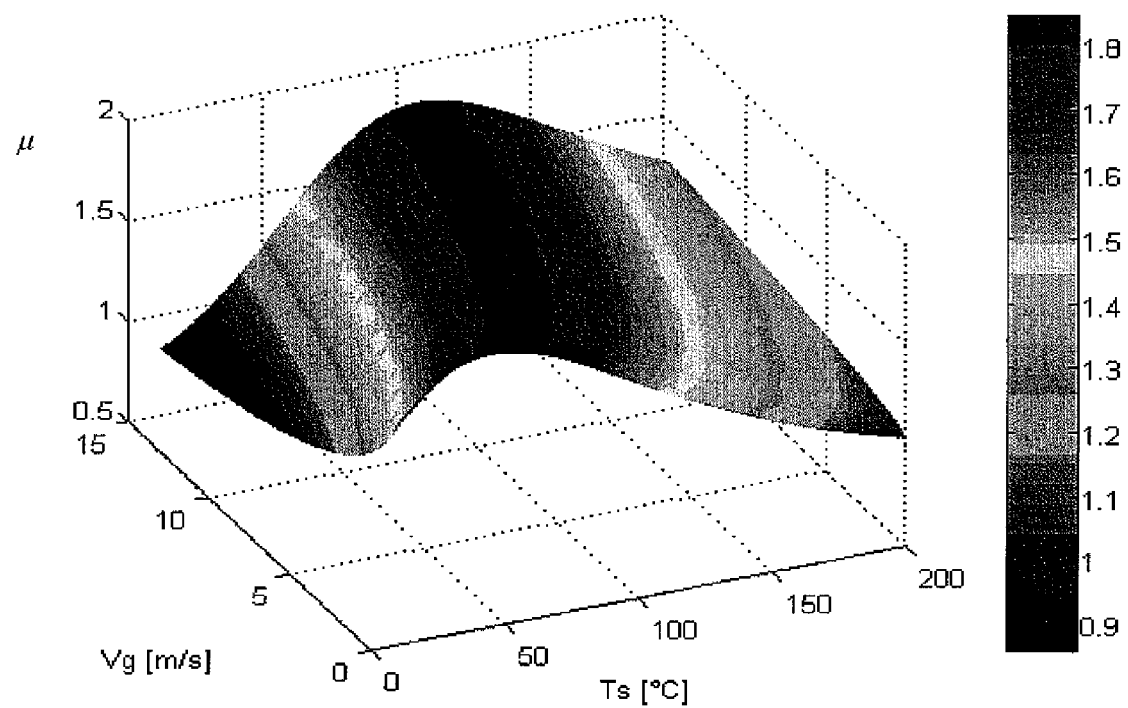
FIG. 10 shows, in a three-dimensional view, the law associating the adherence coefficient to the contact temperature, and to the slip velocity, for a given contact pressure.

Concerning the rubber-ground adherence law, with FIG. 10 illustrating the dependence with regard to parameters Vg and Tc, a plurality of mathematical functions obvious to a person skilled in the art enable the evolution with temperature, velocity and pressure to be reproduced on the basis of specific experiments.

As an example, we can use the formula:

$$\mu(T_C, Vg, P_c) = (e_1 \cdot P_c^{e_2} + e_3)\left[\mu_1 + (\mu_2 - \mu_1)\exp\left(-a^2\log^2\left(\frac{T_C}{T_1}\right)\right)\right]$$

with $$T_1 = T_0 + a_2\log_{10}(Vg/V_0)/[a_1 - \log_{10}(Vg/V_0)],$$

where $\mu_1, \mu_2, T_0, a, a_1, a_2, e_1, e_2, e_3, V_0$ are constants of the model.

As shown in FIG. 10, the adherence coefficient μ has a complex evolution with the temperature and the slip velocity: at low temperatures, this coefficient increases with h the temperature; at high temperatures, it is the reverse. The coefficient μ therefore crosses a maximum with the temperature. This maximum is different depending on the value of the slip velocity. The higher the slip velocity, the more the maximum of this coefficient is obtained at high temperatures.

The general thermal model calculates the temperature profile in the thickness of the rubber on the average per wheel rotation and in the width of the tread. This model makes it possible to obtain the temperature Ti of the interior of the tread, which determines the rigidity G*(Ti), as well as the surface (or peripheral) temperature Ts of the tread at the beginning of the contact area, which is used for the thermal calculation in the contact area (local model).

Figure 11:
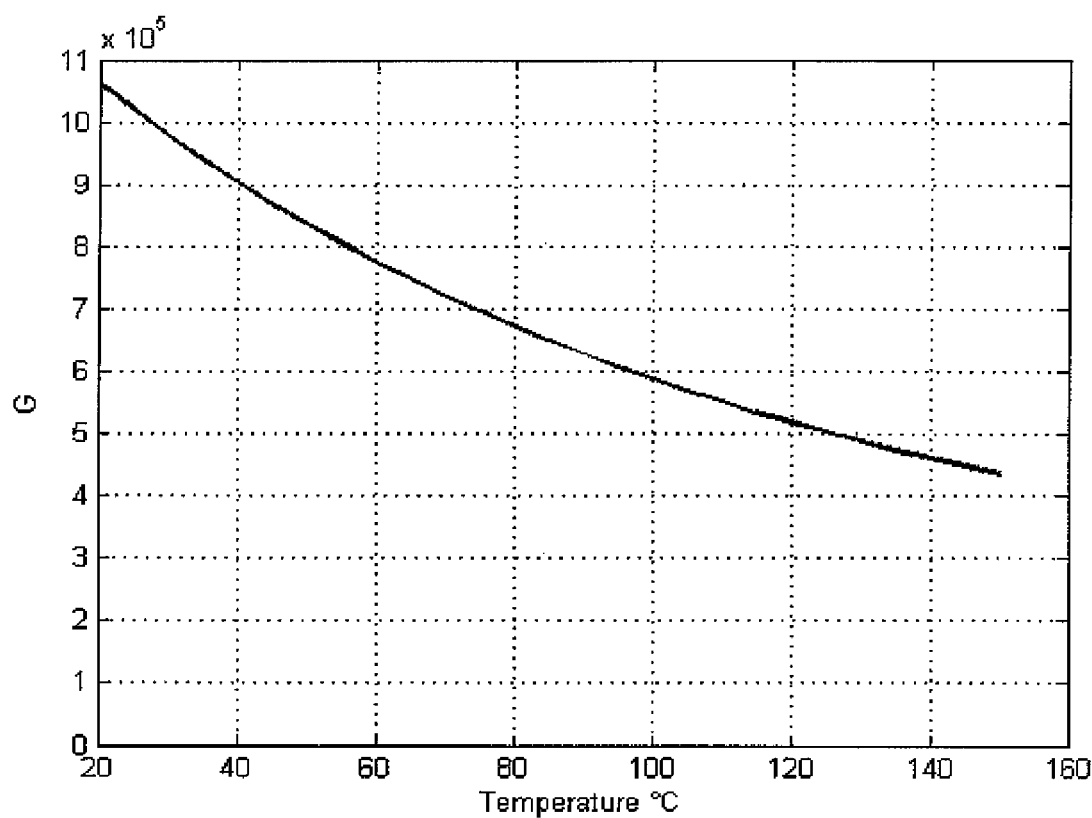
FIG. 11 shows the law associating the shear modulus of the rubber mixture of the tire tread with the temperature, for a given applied force in frequency and deformation.

An example of a law associating rigidity with temperature is shown in FIG. 11. In fact, this law is specific to each material used and depends on the formulation of the mixtures constituting the rubber of the tire. In general, when the temperature of the mixture increases, its rigidity decreases.

The general thermal model takes into account the following mechanisms:
 conduction in the rubber;
 heating by friction between the rubber and the ground;
 heating associated with losses in the rubber; and
 cooling by conduction with the ground and convection with the air.

Figure 12:
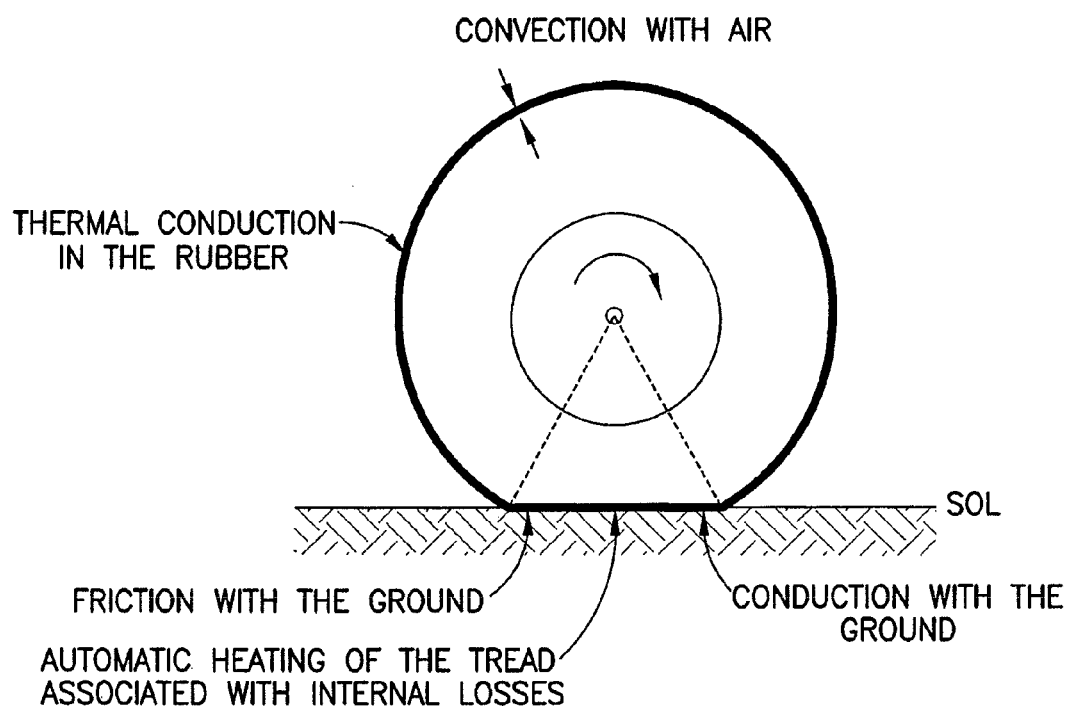
FIG. 12 is a diagram showing the thermal phenomena taken into account in the general thermal model.

FIG. 12 diagrammatically summarizes all of these mechanisms.

Assuming that the temperature is uniform in the width of the tread and over a wheel rotation, it is possible to obtain the one-dimensional equation of the heat in the system of polar coordinates associated with the wheel:

$$\frac{\partial T}{\partial t} = \frac{\lambda}{\rho c_p}\frac{\partial^2 T}{\partial x^2} + \frac{\dot{q}}{\rho c_p} \quad \text{where}$$

T represents the temperature profile in the thickness of the tread [K°];
λ is the thermal conductivity of the rubber [W/m/° K];
ρ is the density [kg/m³];
$c_p$ is the specific heat capacity of the rubber [J/kg/° K];
q is the heating effect due to losses in the rubber in [W/m³];
x represents the radial direction (i.e. in the thickness of the tread);
Effusivity: $e=\sqrt{\lambda\rho c_p}$
Diffusivity:

$$a = \frac{\lambda}{\rho c_p} = \frac{\lambda^2}{e^2} \ [m^2/s]$$

The boundary conditions are however different depending on whether the external surface of the tire or the interface between the tread and the tire breakers are considered.

In the first case, the boundary conditions of the tire surface change over a wheel rotation: outside of the contact area, there is a surface flux due to convection with the surrounding air; in the contact area, there is a surface flux associated with the conduction with the ground and the friction between the rubber and the ground. At the rubber/(ground+air) interface, the boundary flux condition created at the surface of the tire can be written formally as follows:

$$-\lambda \frac{\partial T}{\partial x} = \varphi \; [W/m^2]$$

where $\phi$ is a surface flux to be explained later.

The thermal radiation exchanges are negligible.

However, at the interface between the tread and the breakers of the tire, the assumption of a zero flux can be made (adiabatic condition).

The calculation of the term q [W/m3] for the heating effect due to losses in the rubber can be performed as follows.

When the rubber passes into the contact area, it undergoes deformations by compression and shear, which are a source of heat. The internal power dissipated in the rubber over a wheel rotation is calculated as the product, by the loss function P, of the energy supplied upon entry into the contact area Wf and the wheel rotation frequency:

$$\dot{q} = P W_f$$

The elastic deformation energy density to which the rubber is subjected in the contact area is described as a function of the longitudinal and transverse forces and the load of the tire, enabling the final formulation to be obtained:

$$\dot{q} = P(W_f, T) \frac{1}{2G^*} \frac{V}{2\pi R_0} \frac{F_X^2 + F_Y^2 + F_Z^2/3}{S_{ADC}^2}$$

where $P(W_f, T)$ is the loss function, which takes into account the working point of the rubber in temperature and applied force amplitude, and which can be characterized by specific experimentation.

The temperature T corresponds to the characteristic temperature of the mixture and determines, inter alia, the level of losses and the modulus. Given that the loss and modulus laws are, for example, measured at a frequency of 10 Hz, the temperature T is in fact an equivalent temperature in the sense of the WLF law, so as to have an estimation of the losses and modulus for different applied force frequencies:

$$T = T_i + C_2 \log_{10}(f/10)/[C_1 + \log_{10}(f/10)].$$

where $T_i$ is the internal temperature of the mixture resulting from the general thermal calculation, and where $f = V/(2\pi R_0)$ is the rotation frequency.

As a person skilled in the art will easily understand on reading this description, the same relationship is used to associated the shear modulus of the rubber with the internal temperature Ti in order to take into account the rigidification mechanisms of the mixture when the frequency of the wheel rotation increases.

To calculate the conduction flux with the ground, the tread and the ground can be assimilated to two semi-infinite walls placed in contact during the time interval $\tau_{ca}$. Assuming perfect contact, the conduction flux is written:

$$\varphi_{cond} = -2 \frac{e_g e_{sol}}{e_g + e_{sol}} \frac{1}{\sqrt{t_{adc}\pi}} (T_S - T_{sol})$$

where Ts is the surface temperature of the rubber.

The calculation of the convection flux with the air is made more difficult by the fact that the thermal exchange with the air is highly dependent on the nature of the air flow around the tire. In general, the modeling of convective exchanges is based on semi-empirical formulations. In the specific case of the tire, the following formula can be used:

$$\phi_{con-} = C_{air} 4.126 (2R_0)^{-0.2} V^{0.805} (T_S - T_{A'F})$$

where $C_{air}$ is a constant that takes into account the effect of the forced convection.

The calculation of the frictional flux must account for the fact that the friction created by the slip of the rubber on the ground is a heat production source. Strictly speaking, the energy dissipation occurs in the mass of the rubber over thicknesses of less than a millimeter. In the case of dry contact, it can be estimated that the energy is dissipated at the extreme surface and that it is modeled by a frictional flux. The average frictional flux in the slip zone of the contact area is written as follows:

$$\varphi_{fent} = \alpha \frac{V_g F_\mu}{(1 - ppa) L x L y \, ent}$$

where $\alpha$ is a distribution coefficient of the flux between the rubber and the ground; a value $\alpha=1$ means that the entire frictional flux is directed toward the rubber; a value $\alpha=0$ means that the entire frictional flux is directed toward the ground;

$F_\mu$ is the component of the forced induced by the friction between the rubber and the ground; Vg is the slip velocity; and ppa is the proportion of adherent points in the contact area.

The average thermal flux at the surface of the tread is defined as the average of the various fluxes, weighted by the characteristic period during which these fluxes are effective in a wheel rotation, as shown by the relationship:

$$\varphi = \frac{\varphi_{frot}(1 - ppa) t_{adc} + \varphi_{cond} t_{ca} + \varphi_{conv} t_{Hca}}{t_{ca} + t_{Hadc}}$$

where $\tau_{ca}$ corresponds to the duration of the passage of a tread element in the contact area; where $\tau_{Hca}$ is the duration of the passage of a tread element outside of the contact area; and where $(1-ppa)\tau_{ca}$ is the period during which an element of the tread slips in the contact area.

Figure 13:
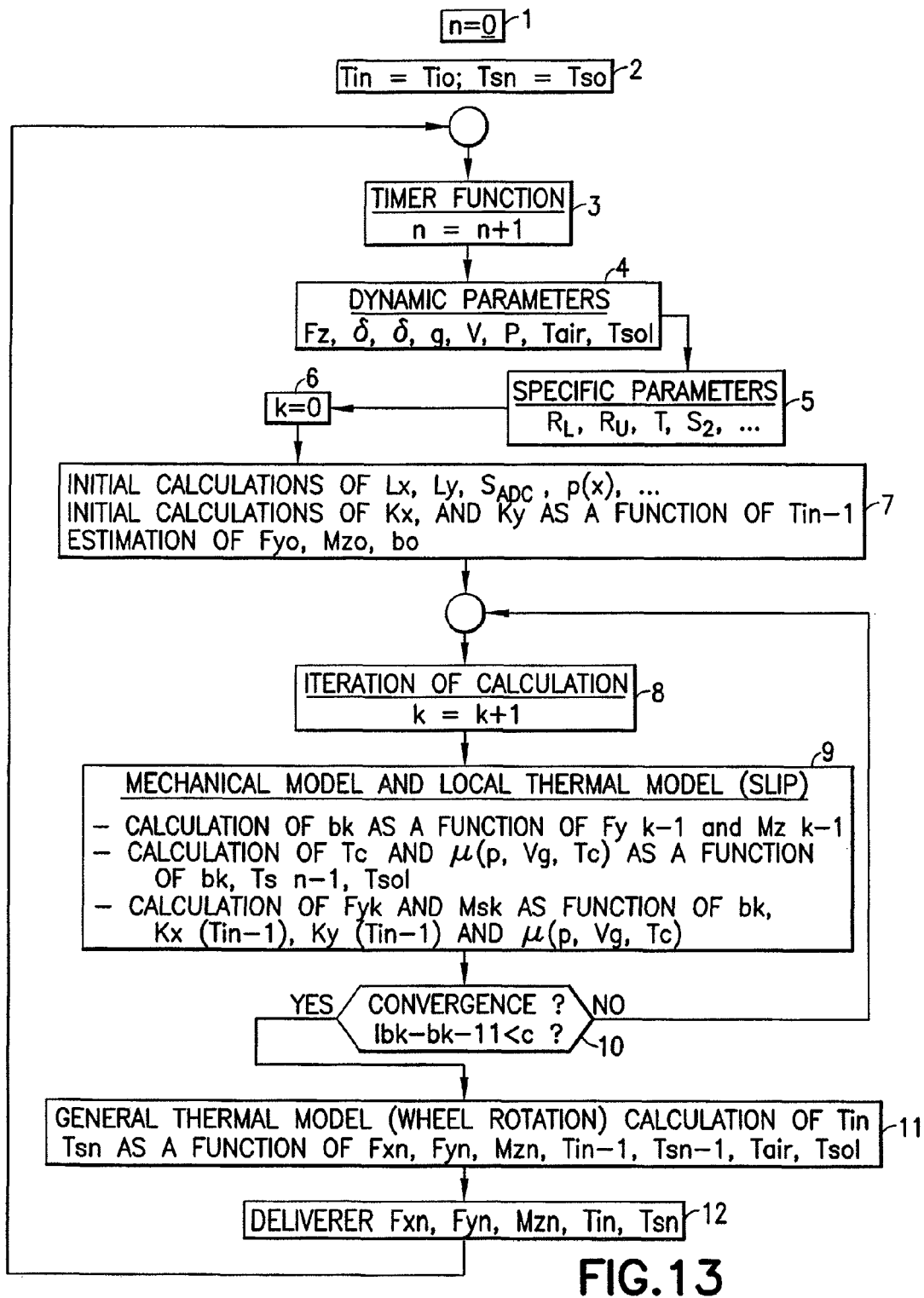
FIG. 13 is an flowchart showing the operational structure of the preferred embodiment of the process of the invention.

FIG. 13 generally shows the operational implementation of a process according to the preferred embodiment of the invention.

Upstream of the operational implementation, this process includes a preliminary modeling phase during which the mechanical model or first model, the local thermal model or second model, and the general thermal wheel rotation model or third model are established.

Each model is established by applying physical laws that are known and/or established by specific experimentation, and takes the form of a system of equations as shown above for each model.

As a reminder, the mechanical model provides the expressions of the longitudinal forces and transverse forces that are transmitted by the tire between the ground and the vehicle, the self-alignment torque which is associated with the intensity of these forces and their distribution in the contact area, and the equilibrium of the basic shear and slip forces of the tire at the crossing point N, assumed to be a single point in the preferred embodiment of the invention, between the adherent and sliding contact zones, which expressions are given on the basis of dynamic parameters that are associated with the physical rolling and use conditions of the tire, specific physical parameters of the tire, and the abscissa b of the crossing point.

The local thermal model provides the expression of the variations in the contact temperature of the tread with the ground from the beginning to the end of the contact area, which variations are dependent in particular on the peripheral temperature of the tread, the temperature of the ground, and the slip of the tread on the ground.

The general thermal model provides the temperature profile in the thickness of the tread and the variations, over a period of a wheel rotation, of the peripheral temperature of the tread and the internal temperature of the tire, as a function in particular of values previously known or estimated from peripheral and internal temperatures, the thermal conduction coefficient of the tread and phenomena with a thermodynamic component such as internal deformations to which the tire is subjected, thermal exchanges between the tire and its environment, and the slip of the tread on the ground.

Finally, the mechanical model takes into account the adherence coefficient and the shear modulus in the form of variables based respectively on the peripheral temperature and the internal temperature.

The operational phase of the process, which is based on the results of the modeling phase, includes numeric value assignment operations and solving operations.

The assignment operations involve essentially assigning numeric values to the dynamic parameters and to the specific parameters, while the solving operations involve essentially deducing, using in particular the mechanical model and the values assigned to the dynamic parameters and to the specific physical parameters, the values of the longitudinal forces Fx, the transverse forces Fy and the self-alignment torque Mz.

The value of the peripheral temperature Ts, which is obtained by solving operations concerning the general thermal model, is used by solving operations concerning the local thermal model in order to take into account the temperature dependence of the adherence coefficient.

On the other hand, the value of the internal temperature Ti, which is also obtained by solving operations concerning the general thermal model, is used by solving operations concerning the mechanical model in order to take into account the temperature dependence of the shear modulus of the rubber of the tire.

The mechanical model preferably includes equations associated with the conditions of equilibrium of the basic shear and slip forces of the tread in the contact area, and on the basis of which the coupling between the mechanical model and the local thermal model is carried out.

In practice, the process of the invention advantageously includes an iterative calculation phase consisting of a series of calculation cycles, in which each calculation cycle includes at least one solving operation concerning the mechanical model and a solving operation concerning the local thermal model.

The operational phase of the process, which follows the modeling phase and which is shown in FIG. 13 for the preferred embodiment of the invention, first includes an operation 1 consisting of initializing a counter index n used for the time measurement.

In operation 2, initial Tso and Tio values are assigned to the peripheral temperature of the tread and to the internal temperature of the tire, for example on the assumption that the tire is initially in thermal equilibrium with the ambient air.

Operation 3 increments the time counted by the timer by a time interval corresponding at least to that which is necessary to perform the subsequent calculations, as described below.

Values previously measured or stored are then assigned to the dynamic parameters (operation 4) and to the specific parameters (operation 5).

Operation 6 involves initializing a counter index k used to count the number of successive calculation cycles carried out inside an iteration loop, which will be described below.

Operation 7 consists of a preparatory phase intended in particular to enable the calculation of contingent quantities of which the value can be considered to be constant for the various calculation cycles of the same iteration loop, enabling the repeated execution of these calculations to be avoided in each calculation cycle of the same iteration loop.

In particular, the preparatory phase 7 is used to calculate the dimensions Lx and Ly of the contact area, its surface $S_{CA}$, the pressure profile p(x) along the contact area, as well as the rigidities Kx and Ky of the tread as a function of the internal temperature Ti at the previous time n−1, i.e. Tin−1.

Estimated values Fyo, Mzo and bo are also assigned to the lateral forces Fy, to the self-alignment torque Mz and to the abscissa b of the crossing point N between the adherent contact zone and the sliding contact zone.

When the input parameters vary little as a function of time, the estimated values Fyo, Mzo and bo can be constituted by the values calculated at the previous time.

Otherwise, the initial slip abscissa bo is determined by assuming that the pressure profile in the length of the contact area is parabolic, and by disregarding the torsional rigidity and the crown rigidity.

In this case, the slip equation (equation 3) has an analytical solution:

$$b_0 = a\left(\frac{4}{3}\frac{a^2}{\mu_0 F_Z/L_y}\sqrt{\left[K_X\frac{\tau}{1+\tau}\right]^2 + [K_Y(\delta + a_1)]^2} - 1\right)$$

Knowing $b_0$, the force $F_{y0}$ and the torque $M_{Z0}$ are then calculated using equations 5 to 7.

It is also necessary to verify that the initial position obtained for the crossing point satisfies the constraint on the lateral shear of the tread, namely $(Y_K-Y_N)\delta'>0$. If this is not the case, the solution envisaged does not make physical sense. It is then necessary to require: $Y_K-Y_N=0$, and the initial value $M_{Z0}$ of the self-alignment torque is set to 0.

Operation 8 increments the counter index k and enables a first or a new calculation cycle (steps 9 and 10) of the iterative phase to be initiated.

This iterative phase makes it possible to solve, by successive approximations, and using previously known or estimated values of the crossing point abscissa b, the transverse forces Fy and the self-alignment torque Mz, new values for these quantities b, Fy and Mz that solve equations 1 to 7 presented above, for the values assigned to the dynamic parameters and to the specific parameters.

These equations are formulated by showing the abscissa b of the crossing point between the adherent contact zone and the sliding contact zone, with the forces in the contact area being separated into two contributions, namely a shear force that is dependent on the rigidities of the rubber, the crown and the carcass of the tire, and a frictional force that is dependent on the law of friction.

The abscissa b is calculated by means of equations 1 to 3 and values Fy and Mz estimated in the previous iteration. It is a scalar equation, of which the solution is restricted ($-a \leq b \leq a$). The calculation of the abscissa b is, for example, performed by combining a bisection and a secant.

If the displacement proposed by the secant method goes beyond the lower and external restrictions, the process switches to a bisection method.

As a plurality of solutions for the abscissa b are possible in principle, the solution chosen is the one that satisfies the condition $(Y_K - Y_N)\delta' > 0$. The integrals $$\int_{-a}^{b} \mu(P(x), T, Vg)P(x)dx \text{ and } \int_{-a}^{b} \mu(P(x), T, Vg)P(x)xdx$$

associated with the friction of the rubber of the tread on the ground are, for example, calculated by using Gaussian quadrature formulas.

To calculate the remainders of the system constituted by equations 4, 5 and 6+7, and to calculate the convergence, it is necessary to formally solve the non-linear system of n equations in n unknown quantities $F(x)=0$.

While a plurality of iterative processes may be possible, the optimal process appears to be the mixed Newton-Raphson/Broyden iterative process known to a person skilled in the art.

In each calculation cycle of order k, step 9 includes in particular an operation involving calculating a new temporary value $b_k$ of the crossing point abscissa using the balance equations 1 to 3 for the basic forces and the previously known or estimated values $F_{yk-1}$ and $M_{zk-1}$ of the transverse forces and the self-alignment torque.

In the preferred embodiment, in which the mechanical model is enriched by the local thermal model and in particular takes into account the influence of the evolution in contact temperature on the value of the frictional coefficient of the rubber of the tire on the ground, step 9 also includes, for each point of the sliding contact zone, a calculation of the contact temperature Tc and of the frictional coefficient on the basis of the newly calculated temporary value $b_k$ of the crossing point abscissa, the peripheral temperature Tsn−1 as known at the previous time, and the temperature of the ground $T_{sol}$, with the peripheral temperature $T_{sn-1}$ of the tire being used to calculate the contact temperature at the beginning of the contact surface.

Finally, step 9 includes the operation that consists of calculating, using the new temporary value $b_k$ of the abscissa of the crossing point, values for the rigidities Kx and Ky of the tread for the internal temperature Tin−1 as known at the previous time, the value of the frictional coefficient μ, and equations 1 to 7, new values $F_{yk}$ and $M_{zk}$ for the transverse forces and the self-alignment torque, which can be used for a possible future calculation cycle.

Step 10 consists of testing the convergence of the iterative phase.

For example, if the respective differences between the new values $b_k$, $F_{yk}$ and $M_{zk}$ and the temporary values $b_{k-1}$, $F_{yk-1}$ and $M_{zk-1}$ obtained in the previous calculation cycle are below respective limits such as ε, then the iterative phase is interrupted. Otherwise, this iterative phase is continued by looping back upstream of operation 8.

In the interruption of the iterative phase, the general wheel rotation thermal model is used (Step 11) to calculate the new updated values $T_{sn}$ and $T_{in}$ of the peripheral and internal temperatures by taking into account changes in these temperatures, since the end of the previous iterative phase, under the effect of all of the phenomena with a thermodynamic component, such as the internal deformations to which the tire is subjected, the thermal exchanges between the tire and its environment (air, ground), and the slip of the tread on the ground.

One may remember that the temperature Ts is the average surface temperature, both in the width and in the circumference of the tire, of the tread, and that the calculation of temperatures Ti and Ts is based on a one-way modeling in the thickness of the tread.

The equations of the general thermal model are solved by a classic finite difference method using a spatial mesh in the thickness of the rubber and a Runge-Kutta $2^{nd}$ order time solution method.

Operation 12, implemented at the end of the iterative phase, consists of generating, for time n, the values of the longitudinal and transverse forces Fxn, Fyn, the self-alignment torque Mzn, the internal temperature Tin of the tire, and the peripheral temperature Tsn of the tread.

The process is then looped back just upstream of the timer incrementation operation 3, and before operation 4 of updating the dynamic parameters which makes it possible to take into account changes undergone by these parameters during the execution of the iterative phase just completed.

The new value Tin of the internal tire temperature will be used for operation 5 of updating specific parameters, or during the preparatory phase 7, in order to deduce the new value of the rigidity G* of the mixture constituting the rubber of the tire, which affects the values of the rigidities Kx and Ky.

In addition, the new value Tsn of the peripheral temperature of the tread will be used in step 9 to calculate the beginning contact temperature Tc of the tread.

It is therefore understood that the coupling between the force determination process and the temperature determination process involves two levels, namely the consideration of the fact that the average temperature Ti of the tread influences the rigidity G* of the mixture and therefore the rigidities Kx and Ky of the tread, and the consideration of the fact that the peripheral temperature Ts of the tread in the contact area influences the coefficient of adherence between the rubber and the ground.

The simulation process described above is particularly applicable to the real-time simulation of the dynamic behavior of a vehicle equipped with a chassis and a plurality of tires rolling on the ground.

This process can then, for example, be implemented on a portable computer having the following characteristics: PC with Windows XP, Pentium 4 3.6 Ghz, 2 Gb of memory; the performance of the process of simulating a single tire in a drift rolling situation and in the presence of slip is 9000 complete calculations per second, in which each calculation corresponds to the determination of the longitudinal and transverse forces, the self-alignment torque and the surface and internal temperatures of the tire at a given time on the basis of dynamic and specific parameters.

In the vehicle applications, each of the mechanical, local thermal and general thermal models, or at least the first of them, is used for each tire and associated with a dynamic chassis model.

Each of the tire models cooperates with this chassis model in order to receive from the chassis model the values of the dynamic parameters or at least some of them, and in order to enable the chassis model to use, for each tire, the values of the longitudinal forces, the transverse forces and the self-alignment torque obtained by implementing the tire models.

Figure 14A:
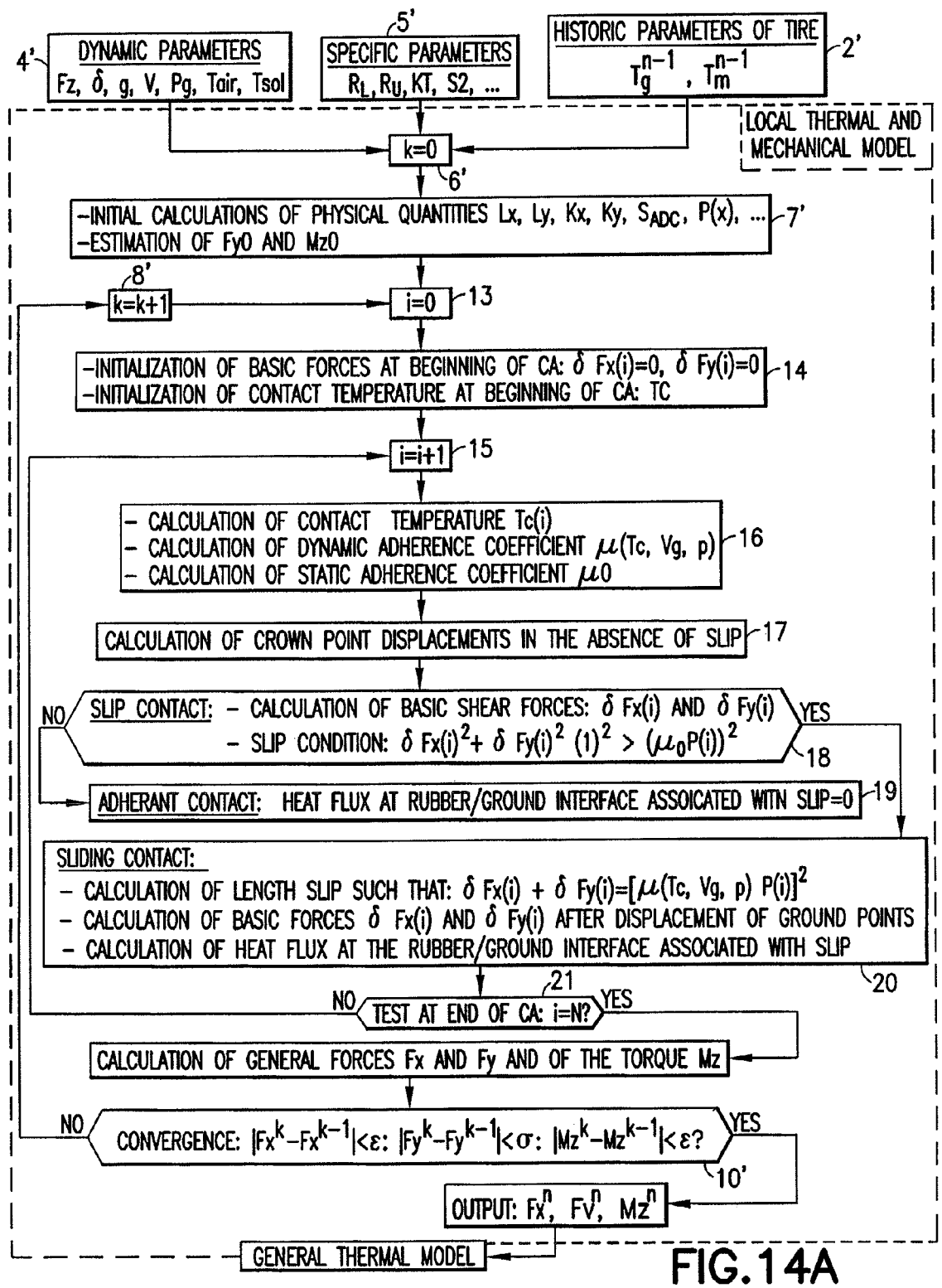
FIGS. 14a and 14b are flowcharts showing the operational structure of another possible embodiment of the invention.
Figure 14B:
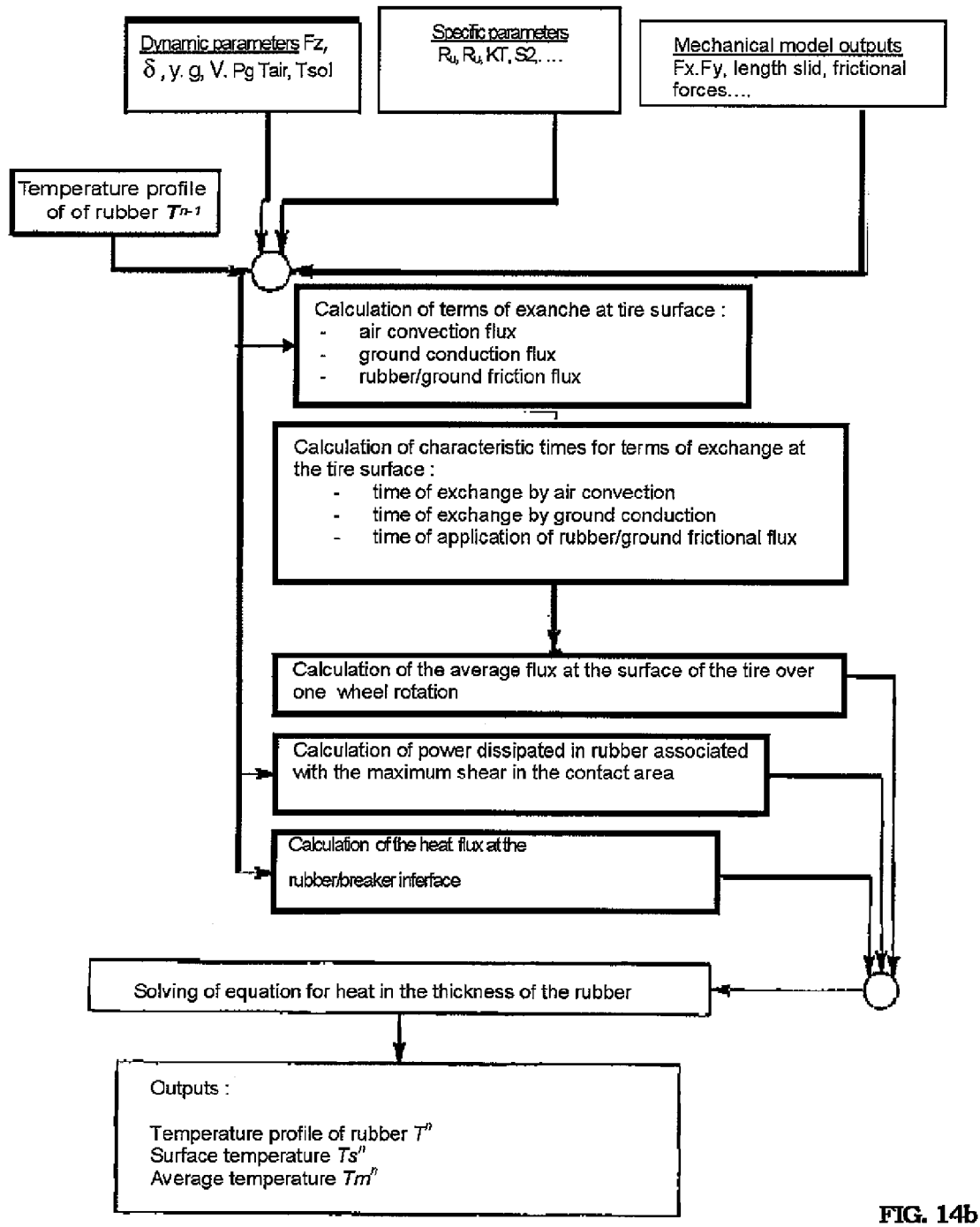

FIGS. 14a and 14b show, for a determined time interval n, the operational phase of another embodiment of the invention that, while being less economical than the previous in terms of calculations, also provides good simulation reliability.

In this embodiment, the contact area is discretized for example over N successive zones of its length and the equilibrium of the basic shear and slip forces of the tread in the contact area (CA) is examined on each surface element.

More specifically, each cycle of each iterative phase includes N successive operations analyzing the conditions of equilibrium of the basic shear and slip forces on the N basic surfaces different from the contact area, and each cycle of the iterative phase is interrupted when all of the basic surfaces considered during this cycle covers the contact area.

Operations 2' and 4' to 8' of this embodiment are the same as operations 2 and 4 to 8, respectively, of the preferred embodiment of FIG. 13.

Operation 13 involves initializing a counter index i used to count the operations for analyzing the conditions of equilibrium of the basic forces on the different basic surfaces.

Operation 14 involves a preparatory phase intended to set to zero the values of the transverse and longitudinal forces δFx(i) and δFy(i) exerted upstream of the first basic surface of the contact area, and to set the initial value of the contact temperature Tc.

Operation 15 increments the counter index i and enables the analysis of the basic forces in a first or a new basic surface of the contact area to be initiated, while operations 16 and 17 involve calculating these forces.

Test 18 is intended to determine whether or not the basic shear forces of the tread are greater than the adherence.

If not, operation 19 sets to zero the heating that would have been associated with the slip of the contact strip on the ground.

However, in the case of slip, operation 20 precisely determines the slip conditions and calculates the thermal flux associated with this slip according to the local thermal model.

Whether or not there is slip, test 21 is carried out in order to determine whether or not the basic surface considered is the last of the N basic surfaces of the tread in the discretized contact area.

If not, the next surface is analyzed after returning to operation 15.

Otherwise, operation 22 is carried out in order to calculate the longitudinal and transverse forces as well as the self-alignment torque by summing the basic forces and the basic torques obtained for the various basic surfaces.

Test 10', which is equivalent to test 10 of FIG. 13, either leads back to operation 8' in order to continue the iterative phase, or to provide the values of the forces and the self-alignment torque for the calculation cycle considered and to implement the assignment and solving operations for the general thermal model, as directly indicated in FIG. 14b.

The invention claimed is:

1. A process for simulating the physical behavior of a vehicle tire rolling on the ground with which the tire tread has an area of contact including at least one adherent contact zone and at least one sliding contact zone, which process includes at least modeling operations, numeric value assignment operations, and solving operations, wherein the modeling operations comprise establishing, by applying physical laws that are known and/or developed by specific experimentation, and as a first model, a model of the longitudinal forces, the transverse forces, and a self-alignment torque, transmitted by the tire between the ground and the vehicle, on the basis of specific physical parameters, including an adherence coefficient and a shear modulus of the rubber of the tire, and on the basis of dynamic parameters associated with the physical conditions of rolling and use of the tire, in which the self-alignment torque is associated with the intensity of the longitudinal and transverse forces and their distribution in the contact area, wherein the assignment operations comprise assigning numeric values to the dynamic parameters and to the specific parameters, wherein the solving operations comprise deducing, using at least the first model and the values assigned to the dynamic parameters and to the specific physical parameters, the values of the longitudinal forces, the transverse forces and the self-alignment torque, and wherein the modeling operations further comprise establishment, as a second model, of a local heating model expressing variations in a temperature of contact of the tread with the ground from the beginning to the end of the contact area due to the contact and the slip of the tread with the ground, and establishment, as a third model, of a general heating and thermal flux model, in which said third model expresses variations, over a period of at least one wheel rotation, in a peripheral tread temperature and an internal tire temperature on the basis of values previously known or estimated from peripheral and internal temperatures, a coefficient of thermal conductivity of the tread, and phenomena with a thermodynamic component such as internal deformations of the tire, heat transfers between the tire and its environment, and slip of the tread on the ground, in which at least the adherence coefficient and the shear modulus are involved in the first model as variables, respectively based on the peripheral temperature and the internal temperature, in which the value of the peripheral temperature, obtained by solving operations concerning the third model, is used by solving operations concerning the second model in order to take into account the temperature dependence of the adherence coefficient, and in which the value of the internal temperature, obtained by solving operations concerning the third model, is used by solving operations concerning the first model in order to take into account the temperature dependence of the shear modulus of the rubber of the tire.

2. The simulation process according to claim 1, wherein the first model includes equations associated with the conditions of equilibrium of the basic shear and slip forces of the tread in the contact area, wherein this process includes at least one iterative calculation phase consisting of a series of calculation cycles, and wherein each calculation cycle includes at least one solving operation concerning the first model and one solving operation concerning the second model.

3. The simulation process according to claim 2, wherein the contact area is discretized at least in a first of its dimensions, wherein each cycle of each iterative phase includes a series of operations for analyzing the conditions of equilibrium of the basic shear and slip forces on respective basic surfaces different from the contact area, distributed along the first dimension of the contact area, and wherein each cycle of the iterative phase is interrupted when the set of basic surfaces considered in said cycle covers the contact area.

4. The simulation process according to claim 2, wherein the first model is established by considering that the contact area includes a single adherent contact zone and a single sliding contact zone separated from one another by a crossing point, wherein the first model takes the form of a system of equations expressed at least according to dynamic parameters, specific parameters and the abscissa of the crossing point, wherein each iterative phase is dedicated to phenomena appearing during a corresponding basic time interval, and wherein each iterative phase is implemented in order to solve, by successive approximations and at least on the basis of values previously known or estimated from the abscissa of the crossing point, the transverse forces, and the self-alignment torque, new values of the abscissa of the crossing point, the transverse forces and the self-alignment torque that solve the system of equations of the first model for the values assigned to the dynamic parameters and to the specific parameters.

5. The simulation process according to claim 4, wherein each new calculation cycle of each iterative phase includes operations comprising:

calculating a new temporary value of the abscissa of the crossing point on the basis of balance equations of the basic forces and the values previously known or estimated from the transverse forces and the self-alignment torque;

calculating, on the basis of the new temporary value of the abscissa of the crossing point and equations associating transverse forces and the self-alignment toque with dynamic parameters, specific parameters and the abscissa of the crossing point, new values for the transverse forces and the self-alignment torque that can be used for a possible future calculation cycle;

conditionally interrupting said iterative phase at least when the difference between the new temporary value of the abscissa of the crossing point and the value previously known or estimated from this abscissa is below a predetermined accuracy limit; and interrupting said iterative phase, assigning to the longitudinal and transverse forces and the self-alignment torque, as values for said phase, the new values of the longitudinal and transverse forces and the self-alignment torque obtained in the most recent calculation cycle.

6. The simulation process according to claim 4, further comprising an implementation operation after the end of each iterative phase and consisting of updating the dynamic parameters in order to take into account changes in said parameters during the time of execution of the iterative phase, and of entering a new iterative phase.

7. The simulation process according to claim 1, wherein the solving operations concerning the third model are performed outside of each iterative phase.

8. The simulation process according to claim 1, wherein each iterative phase is preceded by a preparatory phase during which contingent quantities are calculated, including the dimensions of the contact area, on the basis of the values assigned to the dynamic parameters and to the specific parameters, in which each contingent quantity is used in said iterative phase with a value that was assigned to it in the preparatory phase.

9. Application of the process according to claim 1, to the simulation of the dynamic behavior of a vehicle equipped with a chassis and a plurality of tires rolling on the ground, in which application each of the first, second and third models is used for each tire and associated with a given dynamic chassis model, in which the chassis model provides said models, for each tire, with the values of at least some of the dynamic parameters, and in which the chassis model uses, for each tire, the values of the longitudinal forces, the transverse forces and the self-alignment torque obtained by implementing said models.

* * * * *